(12) United States Patent       (10) Patent No.:     US 7,720,234 B1
Winslow et al.                  (45) Date of Patent:     May 18, 2010

(54) COMMUNICATIONS INTERFACE DEVICE

(75) Inventors: Jonathan T. Winslow, Blacksburg, VA (US); Alex Saban, Blacksburg, VA (US)

(73) Assignee: Dreamsarun, Ltd, Blacksburg, VA (US)

( * ) Notice: Subject to any disclaimer, the term of this patent is extended or adjusted under 35 U.S.C. 154(b) by 1162 days.

(21) Appl. No.: 11/123,669

(22) Filed: May 6, 2005

Related U.S. Application Data

(60) Provisional application No. 60/569,430, filed on May 7, 2004.

(51) Int. Cl.
   *H04R 1/10*   (2006.01)
   *H04R 5/02*   (2006.01)
   *H04M 9/00*   (2006.01)
   *H04M 1/00*   (2006.01)

(52) U.S. Cl. .................. 381/74; 381/309; 379/430; 455/569.1; 455/575.2

(58) Field of Classification Search .................. 381/74, 381/309, 375–381; 379/430, 431; 455/569.1, 455/575.2
See application file for complete search history.

(56) References Cited

U.S. PATENT DOCUMENTS

| | | | | |
|---|---|---|---|---|
| 4,621,372 A | * | 11/1986 | Relyea | 381/74 |
| 4,993,065 A | * | 2/1991 | Chiou | 381/375 |
| 7,395,090 B2 | * | 7/2008 | Alden | 381/74 |
| 7,428,429 B2 | * | 9/2008 | Gantz et al. | 455/575.1 |

* cited by examiner

*Primary Examiner*—Ping Lee
(74) *Attorney, Agent, or Firm*—Charles S. Sara, Esq.; Dewitt Ross & Stevens S.C.

(57) ABSTRACT

A communications interface device is wearable about a user's neck, and can have various audio communications devices—such as cellphones, walkie-talkies, radios, scanners, digital music players, etc.—connected to the interface device to serve as a central communications hub. An audio input microphone is provided on the device to pick up audio messages that the user wishes to deliver, with such messages then being directed to the appropriate connected communications device. Speakers, which preferably extend from the interface device via flexible leads, supply audio from one or more of the connected communications devices to the user's ears. A switch or other selector is provided on the interface device to allow user selection of the communications devices from which the user wishes to receive (and to which the user wishes to send) messages.

24 Claims, 1 Drawing Sheet

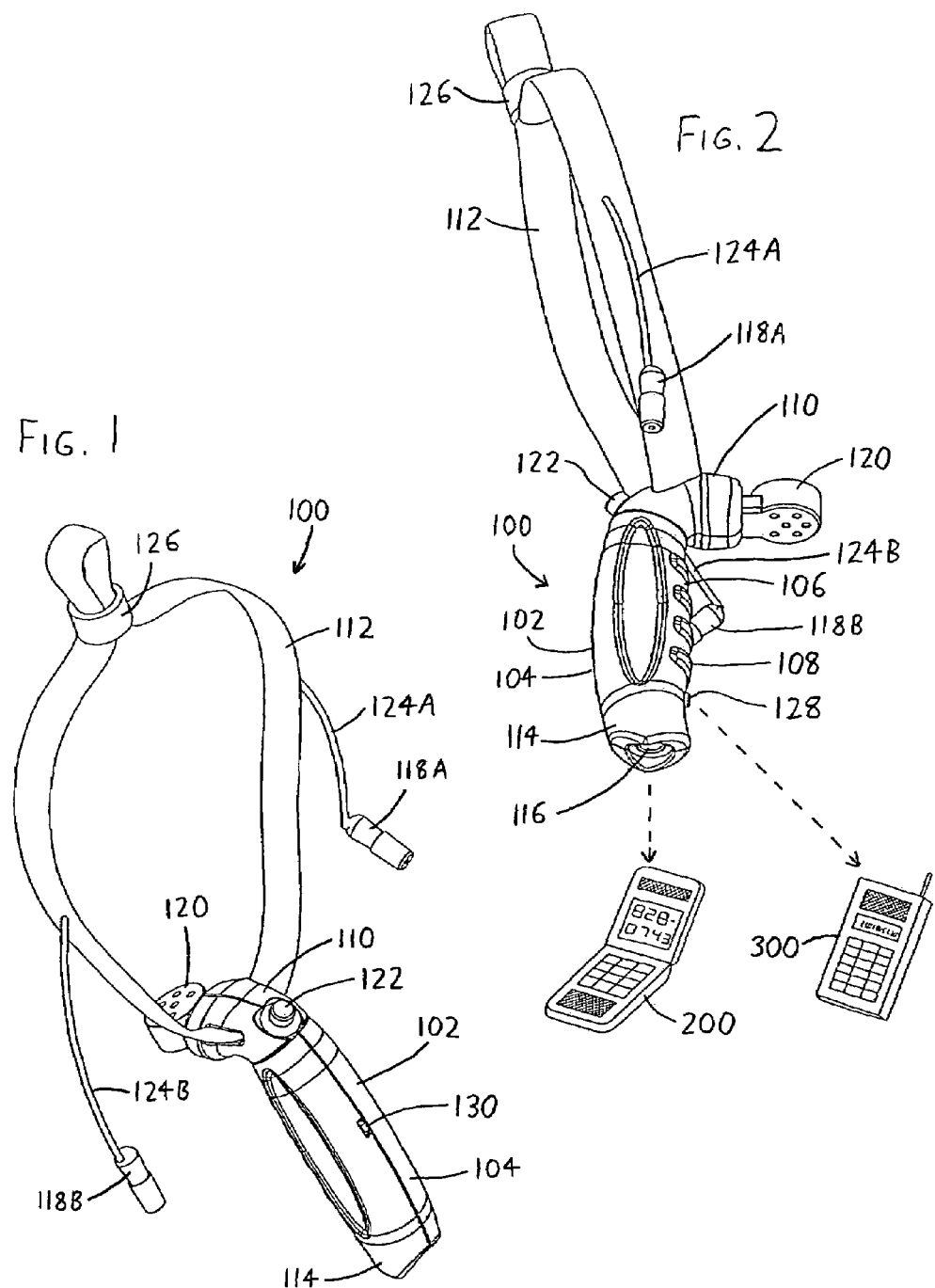

COMMUNICATIONS INTERFACE DEVICE

CROSS-REFERENCE TO RELATED APPLICATIONS

This application claims priority under 35 USC §119(e) to U.S. Provisional Patent Application 60/569,430 filed 7 May 2004, the entirety of which is incorporated by reference herein.

FIELD OF THE INVENTION

This document concerns an invention relating generally to portable communications devices (such as walkie-talkies, portable radios, and portable music players), and more specifically to portable communications devices which are particularly adapted for use by spectators at sporting events, rallies, concerts, and similar events.

BACKGROUND OF THE INVENTION

It is becoming increasingly popular at sporting events, rallies, concerts, and other gatherings to engage in wireless communications with others, whether these others are present at the gathering or are located elsewhere. As an example, attendees may communicate with other attendees at an event with wireless/cellular telephones, Family Radio Service (FRS) radios or other walkie-talkies, or the like to exchange commentary about the event, and to ask what others are seeing from their respective vantage points. At the same time, many attendees also like to simultaneously use radios, scanners, or the like to monitor simultaneous broadcasts of the event, or to use portable music players (e.g., MP3 players, CD players, etc.) to simultaneously or periodically listen to music. As an example, at NASCAR or other racing events, members of a party will often position themselves about various portions of a track, and will communicate with each other about their observations while simultaneously using scanners to listen to pit crew conversations. While these arrangements can add excitement to an event, they can also be burdensome and inconvenient, since one must simultaneously handle multiple phones, radios, scanners, etc. (as well as the encumbrance of any associated cords/leads), and at the same time one may be carrying an event program, binoculars, food/beverages, or other matter. This often leads to frustration since one simply does not have enough "free hands" to deal with all of these items. Difficulties also arise with communications because of background noise at the event, which can be compounded owing to the use of radios, scanners, etc.

The same problems and frustrations are also often shared by participants in the events themselves. For example, coaches and event coordinators—who usually have a limited view of the overall event—often wish to communicate with others at the event, while at the same time monitoring broadcasts of the event. The need for communications is often particularly acute at events such as long-distance races, golf tournaments, fishing competitions, sailing regattas, and the like, where participants and coordinators may be widely spread out over a large area. Additionally, the participants/coordinators may be involved in activities which require their attention and the full use of their hands, leaving little opportunity to juggle two-way communicators and/or one-way communications receiver devices. The same difficulties are often shared in industry by construction workers, plant maintenance personnel, security personnel, and the like.

Some of these difficulties are alleviated with use of hands-free enhancements for the foregoing communications devices, such as headsets or ear loops which bear speakers for the user's ears, and also bear hands-free microphones (such as clip-on microphones, boom microphones that curve around to the user's mouth, etc.). However, such devices are usually only adapted to connect to a single phone, radio, scanner, music player, or other communications device, and the headsets can sometimes make it difficult to make effective use of a second or subsequent communications device. Additionally, the headsets can be cumbersome, uncomfortable, and/or difficult to use in situations where the user might need to wear a hat, helmet, or other gear for sun or impact protection or for other purposes.

It would therefore be useful to have available some device which allows a user to make effective use of multiple communications devices (such as phones, radios, scanners, music players, etc.), while minimizing the entanglements of multiple cords or other leads, and while allowing a greater degree of hands-free use of the devices.

SUMMARY OF THE INVENTION

The invention involves a communications interface device which is intended to at least partially solve the aforementioned problems. To give the reader a basic understanding of some of the advantageous features of the invention, following is a brief summary of a preferred exemplary version of the device. As this is merely a summary, it should be understood that more details regarding the preferred versions may be found in the Detailed Description set forth elsewhere in this document. The claims set forth at the end of this document then define the various versions of the invention in which exclusive rights are secured.

Referring to the accompanying drawings, the exemplary communications interface device 100 has a communicator body 102 which is intended to be worn about a user's neck via a neck loop 112, with an audio input microphone 120 situated below a user's chin to pick up audio messages spoken by the user. A first communications device 200 (not shown to scale in FIG. 2), such as a cellphone, walkie-talkie, or other wireless communications device, may be connected to an audio input/output connector 116 (FIG. 2, e.g., a socket/jack) to transmit these messages to others, and the first communications device 200 may in turn receive messages from others and provide them through the audio input/output connector 116 to audio output speakers 118A and 118B which are fit in the user's ears. To decrease the transmission of spurious messages or noise from the first communications device 200, an audio input button 122 can be provided to allow only selective passage of audio messages from the audio input microphone 120 to the first communications device 200 (i.e., the audio input microphone 120 may be disabled unless the audio input button 122 is depressed). A second communications device 300 (not shown to scale in FIG. 2), such as a scanner, radio, music player, or the like, may also be connected to the communicator body 102 via an audio input connector 128 to supply broadcasts or other audio to the audio output speakers 118A and 118B. Since simultaneous play of audio signals from both the first and second communications devices 200 and 300 through the audio output speakers 118A and 118B can be confusing, the interface device 100 preferably also includes audio selector means, here depicted in FIG. 2 as a four-way switch 130 which selectively (1) plays signals only from the first device 200; (2) plays signals only from the second device 300; (3) plays signals from the first device 200 in one speaker 118A and plays signals from the second device 300 in the other speaker 118B; and (4) plays signals from the second device 300 in one speaker 118A and plays signals from the first device 300 in the other speaker 118B. Other states are also possible, e.g., one wherein some mix of signals from both devices 200 and 300 are played through one or both speakers 118A and 118B.

The communications interface device 100 therefore allows a user to port his/her preexisting communications devices to a single unit from which a user may easily select desired audio sources, and deliver audio messages when desired. Since the communications devices 200 and 300 (which will often be clipped about the user's belt of the like) have all of their leads intersect at the communicator body 102, which is situated adjacent the user's chest, the leads will be largely prevented from obstructing or entangling the user's arm movements, and the user is also allowed largely hands-free operation of the communications devices 200 and 300. The only time a user need make adjustments to enable communications is if he/she wishes to actuate the audio input switch 122 to deliver an audio message (and even this is not necessary if the audio input switch 122 is set to a constantly on state), and/or if he/she wishes to change the audio mix provided by the selector means 130. Further, owing to the ergonomic joystick-like design of the communicator body 102, wherein the audio input switch 122 is positioned similarly to a joystick button, actuating the switch 122 to talk is easy and intuitive. The audio input microphone 120 is automatically situated beneath the user's chin in close proximity to his/her mouth (or can be so situated with appropriate adjustment of the neck loop 112) to receive messages that the user wishes to transmit to others. Further, by having the audio output speakers 118A and 118B extend within or immediately alongside the neck loop 112 (see particularly FIG. 1), and then extend outwardly from the neck loop 112 at approximately the user's shoulder level, the speaker leads 124A and 124B can be formed with minimal length so that dangling and annoying leads can be avoided.

Further advantages, features, and objects of the invention will be apparent from the following detailed description of the invention in conjunction with the associated drawings.

BRIEF DESCRIPTION OF THE DRAWINGS

FIG. 1 is a perspective view of an exemplary version of the communications interface device 100, shown from above and from the rear, much as it would appear before a user slips the neck loop 112 over the user's neck.

FIG. 2 is another perspective view the communications interface device 100, shown from the side and below, along with first and second communications devices 200 and 300 (which are not shown at the same scale as the device 100).

DETAILED DESCRIPTION OF PREFERRED VERSIONS OF THE INVENTION

Referring to the accompanying FIGS. 1 and 2, a preferred version of the communications interface device (which is generally denoted by the reference numeral 100) includes an elongated communicator body 102 which is ergonomically sized and configured to be comfortably gripped in a user's hand in a manner similar to the gripping of a joystick, with the length of the communicator body 102 being rounded about its circumference. The body rear side 104, against which a user's palm is intended to rest, is smooth, and the opposing body front side 106 (see FIG. 2) bears raised finger ridges 108 between which a user's fingers may rest. The upper portion 110 of the communicator body 102 preferably includes a neck loop 112 which is adapted to fit about a user's neck, thereby allowing a user to wear the communicator body 102 about his/her neck with the lower portion 114 descending downwardly toward his/her chest.

At the lower portion 114 of the communicator body 102, preferably at its very bottom, an audio input/output connector 116 (e.g., a jack/socket, see FIG. 2) is provided into which a user may connect a separate first communications device. The first communications device, depicted schematically (and not to scale) at 200 in FIG. 2, is preferably a two-way communications device such as a walkie-talkie, portable/cellular telephone, or similar wireless communicator allowing two-way delivery and reception of audio messages (which, as will be discussed below, will be achieved through the communications interface device 100). The audio input/output connector 116 is preferably provided at or near the bottom of the communicator body 102 because the first communications device 200 will often be clipped onto a user's belt, and thus any connecting leads extending between the first communications interface device 200 and the audio input/output connector 116 will extend from the bottom of the communicator body 102 and will generally not interfere with the user's reach or activities.

First and second audio output speakers 118A and 118B (collectively referred to as the audio output speakers 118) are then provided, with the audio output speakers 118 being capable of outputting any first audio signal delivered by the first communications device 200 into the audio input/output connector 116. The audio output speakers 118 are illustrated in the drawings as earplug-style (in-the-ear) speakers, but they could instead be provided in a form which rests out of the ear, e.g., on loops which fit about the tops of the ears. While the audio output speakers 118 could be provided with some type of connection which fits about the head (e.g., they might be provided on the opposite sides of an arch which fits about the head, as with headphones), the audio output speakers 118 are preferably unconnected such that they can be independently positioned into or out of a respective ear as desired, thereby allowing a user to install only one of the audio output speakers 118 in one ear if the user so desires. Additionally, it is preferred that the audio output speakers 118 be personal speakers—ones which limit sound emission to the user/wearer rather than emitting it at such a volume that others can overhear—though the audio output speakers 118 could be replaced with one or more "larger area" speakers if desired.

An audio input microphone 120 is also provided for picking up audio messages spoken by the user, with the user's audio message then being delivered via the audio input/output connector 116 to the first communications device 200 for transmission elsewhere (i.e., to another person's communications device 200). In short, when a suitable first communications device 200 is connected to the audio input/output connector 116, the audio output speakers 118 and audio input microphone 120 will serve as audio delivery/receipt means alongside (or instead of) any provided on the first communications device 200 itself. Preferably, an audio input switch 122 is also provided on the communications interface device 100, with the audio input switch 122 selectively supplying any audio messages delivered by the user to the audio input microphone 120 to the audio input/output connector 116. In other words, audio messages delivered to the audio input microphone 120 will not be delivered to the first communications device 200 unless such delivery is enabled by the audio input switch 122. While the audio input switch 122 could be a standard switch which remains in an off or on state once placed in a selected state by a user, the switch 122 is more preferably a momentary switch which only picks up audio messages at the audio input microphone 120 when it is depressed or otherwise actuated. Thus, if a user is using the communications interface device 100 in a noisy environment, the person with whom the user is communicating via the first communications device 200 will not be constantly subjected to the surrounding noise in the user's environment, since this person will only hear the noise (and the user's voice) when the audio input switch 122 is appropriately actuated. Additionally or alternatively, the audio input switch 122 may be a multifunction switch which, apart from enabling/disabling the audio input microphone 120, also enables and/or disables other functions. For example, it might be a "push to talk" switch which disables audio to the audio output speakers 118 while enabling the audio input microphone 120 (and vice versa). (Further, such enabling/disabling could occur either in the interface device 100 or in the communications device 200.) As another example, the audio input switch 122 might be actuated to enable communications with another user through the audio input microphone 120, and might then terminate the communications (e.g., close the call at a cellphone communications device 200) when the audio input switch 122 is actuated again.

The foregoing elements are preferably arranged in a manner similar to that shown in the drawings, with the neck loop 112, audio input microphone 120, and audio input switch 122 being situated at or near the top of the communicator body 102, and with the audio output speakers 118A and 118B each being provided on a respective flexible lead 124A and 124B (collectively leads 124) which preferably extends from the neck loop 112. These leads 124 actually extend from the communicator body 102, but are constrained to extend within (or immediately alongside) the neck loop 112. In this manner, when a user wears the communications interface device 100 with the neck loop 112 about his/her neck, the audio output speakers 118 will be situated in closer proximity to the user's ears, and the leads 124 need not have significant length to reach the user's ears. Thus, there is no need for long, dangling, and potentially entangling (or otherwise annoying) leads 124 between the audio output speakers 118 and the communicator body 102. While the leads 124 might have some amount of excess length so that a user can easily position the audio output speakers 118 about his/her ears as desired, it is preferred that their length be kept short, and that the primary means for repositioning the leads 124 with respect to the user's ears is to adjust the effective size of the neck loop 112. This may be done with use of a neck loop adjustment clamp 126, which is shown in the drawings as a ring which is tightly fit about a section of the neck loop 112 so that sliding the ring toward or away from the communicator body 102 resizes the neck loop 112. However, the adjustment clamp 126 may be provided in different forms (e.g., as a buckle which may slide along the neck loop 112 to resize it).

By situating the audio input microphone 120 at or near the top of the communicator body 102 (and most preferably at or above the location at which the neck loop 112 extends from the communicator body 102), the audio input microphone 120 is effectively situated closer to the user's mouth. This allows a user to easily grasp the communicator body 102 as it hangs about the user's neck, lift it so the audio input microphone 120 is adjacent the user's mouth (if it is not sufficiently close already), and depress the audio input switch 122 to speak an audio message into the audio input microphone 120. Where the communicator body 102 is fashioned similarly to a joystick, and the audio input switch 122 is situated at or near the top of the communicator body 102 in the manner of a joystick thumb button, operation is easy and intuitive. It is also preferable to situate the audio input microphone 120 on the opposite side of the communicator body 102 from the audio input switch 122 so that when the user grasps the communicator body 102 under his/her chin, with his her/thumb over the audio input switch 122, the audio input microphone 120 is effectively situated immediately under the user's mouth. Thus, in the preferred communication device 100, the audio input switch 122 is located on the body rear side 104 and the audio input microphone 120 is rigidly affixed to the communicator body 102 to protrude forwardly from the body front side 106.

Apart from the audio input/output connector 116, it is also desirable to provide the communications interface device 100 with one or more additional connectors for audio input and/or output to allow the device 100 to interface with additional communication devices apart from the first communications device 200—for example, to allow a user to communicate through both a cellphone and a two-way radio substantially simultaneously. The drawings depict one simple arrangement wherein an audio input connector 128 (see FIG. 2) is provided into which a user may connect a second communications device 300 (such as a portable radio, scanner, or digital music player) which outputs a second audio signal to one or both of the audio output speakers 118. This allows a user to (for example) trade audio messages with others at a sporting event via a walkie-talkie or similar two-way first communications device 200, and at the same time listen to coverage of the sporting event via a portable radio or similar one-way second communications device 300. However, since it could be confusing or difficult to listen to two or more audio feeds simultaneously, the communications interface device 100 is preferably provided with audio selector means which allow the user to selectively deliver (1) solely the first audio signal from the first communications device 200 to both audio output speakers 118 (and exclude the second audio signal from the second communications device 300 from both audio output speakers 118); (2) solely the second audio signal from the second communications device 300 to both audio output speakers 118 (and exclude the first audio signal from the first communications device 200 from both audio output speakers 118); and possibly (3) deliver at least a portion of each of the first and second audio signals to one or both of the audio output speakers 118. In one simple preferred form, the audio selector means takes the form of a switch 130 (see FIG. 1) or slide which simply switches the audio feed to the audio output speakers 118 between the first audio signal from the first communications device 200, the second audio signal from the second communications device 300, and a mixture of the two (i.e., the first and second audio signals can each be delivered to a respective one of the first and second audio output speakers 118). Most preferably, the audio selector means is a four-position switch 130 which selectively allows (1) delivery of audio from the first communications device 200 to both of the audio output speakers 118; (2) delivery of audio from the second communications device 300 to both of the audio output speakers 118; (3) delivery of audio from the first communications device 200 to the first audio output speaker and delivery of audio from the second communications device 300 to the second audio output speaker; and (4) delivery of audio from the first communications device 200 to the second audio output speaker and delivery of audio from the second communications device 300 to the first audio output speaker. (A fifth "no signal" switch position may also be desirable for times when a user does not want any audio.) However, the audio selector means 130 could take forms other than a switch, such as a translatable slide, a rotatable dial or knob, or a functionally equivalent device which is adjustable to alter the amount of audio delivered from each device 200/300 to one or both of the audio output speakers 118. For example, when a selector knob is fully rotated in one direction, only audio from the first communications device 200 might be heard in the audio output speakers 118; when fully rotated in the other direction, only audio from the second communications device 300 might be heard in the audio output speakers 118; and when rotated to a position in between, a proportional mix of audio from both devices 200/300 might be heard in the audio output speakers 118. While it is preferred that no one of the speakers 118A and 118B receive audio signals from two or more sources at the same time (since the mixed audio signals can then be difficult to interpret), such an arrangement could be used, preferably with some means (such as a rotatable knob or dial) which allows the user to define the proportions between the audio signals in the mix.

A preferred version of the device has been shown and described above to illustrate different possible features of the device and the varying ways in which these features may be arranged. Apart from combining the different features of the device in varying ways, other modifications are also considered to be within the scope of the invention. Following is an exemplary list of such modifications.

First, the communications interface device 100 might be provided with one or more of the first communications device 200, the second communications device 300, and/or other communications devices incorporated (i.e., directly integrated into the communicator body 102, rather than being connected via the audio input/output connector 116, the audio input connector 128, and/or any other audio connectors that might be provided if other communications devices are to interface with the device 100). However, for sake of cost and versatility, it is preferred that the device 100 merely serve as an interface between the user and the user's preexisting communications devices, thereby better allowing a user to choose a communications device having the features that he/she desires and subsequently using it in combination with the device 100.

Second, while features such as the audio output speakers 118 and the audio input microphone 120 are preferably provided as built-in, integrally connected features of the device, they could instead be provided as removable/replaceable features which connect to the device via additional audio connectors (i.e., jacks/sockets, not shown in the drawings). This would allow the user to replace the audio output speakers 118 and/or the audio input microphone 120 if they become broken or require an upgrade, and the user could (for example) replace the audio output speakers 118 with lightweight headphones (if desired), replace the audio input microphone 120 with a clip-on microphone (if desired), etc. In this respect, it might be desirable to make any audio connector provided for the audio output speakers 118 an audio input/output connector similar to the connector 116, so that if the user installs a pair of headphones (or an ear loop or other audio delivery device) having a boom microphone which extends in front of the user's mouth, this device can serve in place of both the audio output speakers 118 and the audio input microphone 120. It may be desirable to provide clips, loops, hook-and-loop straps, or the like upon portions of the neck loop 112 so that if a user installs a pair of earplug-style audio output speakers (similar to the audio output speakers 118), the leads to each speaker can be restrained to extend alongside the neck loop 112, thereby reducing the annoyance of dangling speaker leads.

Third, the device 100 could, if desired, include additional or alternative audio connectors (i.e., audio input connectors, audio output connectors, or audio input/output connectors) allowing attachment of supplemental microphones, speakers, or the like for use by additional users apart from the one wearing the device 100. Such an arrangement might be cumbersome insofar as the other users would be "tethered" to the wearer, but the arrangement may be acceptable (or even attractive) for couples and families.

Fourth, while the device 100 is not shown with components for modifying audio input and/or output—such as volume controls, high frequency filters/amplifiers (treble controls), and/or low frequency filters/amplifiers (bass controls)—these features could be incorporated if desired. If amplifiers or the like are desired, these (plus any powering batteries) can be incorporated into the communicator body 102. Additionally, the device 100 can incorporate active noise cancellation or other features to ease communications.

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A communications device comprising:
    a. first and second audio output speakers, each being adapted to fit within or about a user's ear;
    b. an audio input microphone into which a user may deliver an audio message;
    c. an audio input/output connector into which a user may connect a first device which both:
        (1) outputs a first audio signal to one or both of the audio output speakers, and
        (2) receives audio messages delivered by the user into the audio input microphone;
    d. an audio input connector into which a user may connect a second device which outputs a second audio signal to one or both of the audio output speakers;
    e. audio selector means, the audio selector means allowing the user to selectively:
        (1) deliver the first audio signal to both audio output speakers and exclude the second audio signal from both audio output speakers;
        (2) deliver the second audio signal to both audio output speakers and exclude the first audio signal from both audio output speakers; and
        (3) deliver each of the first and second audio signals to a respective one of the audio output speakers; and
    f. an elongated communicator body sized and configured to comfortably fit in a user's hand, with the length of the body being rounded about its circumference, wherein the communicator body is structured to accommodate a user's hand wrapped around the communicator body's circumference without the hand obstructing the audio input microphone.

2. The communications device of claim 1 further comprising an audio input switch which selectively supplies audio messages delivered to the audio input microphone to the audio input/output connector wherein the communicator body is structured to accommodate a user's hand wrapped around the communicator body's circumference without the hand obstructing the audio input switch.

3. The communications device of claim 1 further comprising
    a neck loop extending from the communicator body, the neck loop being adapted to fit about a user's neck,
    wherein:
(1) the audio input/output connector, audio input connector, and audio selector means are provided on the communicator body below the neck loop, and (2) the audio input microphone is provided on the communicator body at or above the location at which the neck loop extends from the communicator body.

4. The communications device of claim 3 wherein the audio input microphone is rigidly affixed to the communicator body.

5. The communications device of claim 4 wherein the audio input microphone protrudes forwardly from the communicator body at or adjacent the location at which the neck loop extends from the communicator body.

6. The communications device of claim 3 further comprising an audio input switch which selectively supplies audio messages delivered to the audio input microphone to the audio input/output connector, the audio input switch being located above the audio input/output connector, audio input connector, and audio selector means.

7. The communications device of claim 3:
   a. further comprising an audio input switch which selectively supplies audio messages delivered to the audio input microphone to the audio input/output connector, and
   b. wherein the audio input microphone and audio input switch are located in separate planes on opposite sides of the location at which the neck loop extends from the communicator body.

8. The communications device of claim 3 wherein the audio input/output connector is situated at the bottom of the communicator body.

9. The communications device of claim 1 further comprising:
   a neck loop extending from the communicator body, the neck loop being adapted to fit about a user's neck,
   wherein:
   (1) the first and second audio output speakers are each provided on a respective flexible lead extending from the communicator body,
   (2) at least a portion of each flexible lead is constrained to extend within or immediately alongside the neck loop, and
   (3) the audio input/output connector, audio input connector, and audio selector means are provided on the communicator body.

10. The communications device of claim 1 further comprising:
    a neck loop extending from the communicator body, the neck loop being adapted to fit about a user's neck,
    wherein the first and second audio output speakers are each provided on a respective flexible lead extending from the neck loop, and the audio input/output connector, audio input connector, and audio selector means are provided on the communicator body.

11. The communications device of claim 10 further comprising an adjustment clamp on the neck loop, the adjustment clamp allowing resizing of the neck loop.

12. The communications device of claim 1 further comprising a neck loop extending from the communicator body, the neck loop being adapted to fit about the user's neck, wherein the first and second audio output speakers are connected to the communicator body by leads, wherein a portion of the lead is constrained within the neck loop such that the length of the lead extending between the neck loop and the audio output speakers is minimally sufficient to reach the user's ear.

13. A communications device comprising an elongated communicator body with a length being rounded about its circumference and being sized and configured to be comfortably gripped in a user's hand in the manner of a joystick, the communicator body having:
   a. an upper portion which includes:
      (1) a neck loop extending therefrom, the neck loop being adapted to fit about a user's neck;
      (2) first and second audio output speakers, each being adapted to fit within or about a user's ear;
      (3) an audio input microphone into which a user may deliver an audio message; and
      (4) an audio input switch which selectively supplies audio messages delivered to the audio input microphone to an audio input/output connector,
   b. a lower portion which includes the audio input/output connector into which a user may connect a first device which both:
      (1) outputs a first audio signal to one or both of the audio output speakers, and
      (2) receives audio messages delivered by the user into the audio input microphone when the audio input switch is activated;
   wherein the communicator body is structured to accommodate the user's hand wrapped around the circumference of the communicator body without the hand obstructing the audio input microphone or the audio input switch.

14. The communications device of claim 13 wherein the first and second audio output speakers each extend from the neck loop.

15. The communications device of claim 14 further comprising an adjustment clamp on the neck loop, the adjustment clamp allowing resizing of the neck loop.

16. The communications device of claim 13 wherein the body also has an audio input connector into which a user may connect a second device which outputs a second audio signal to one or both of the audio output speakers.

17. The communications device of claim 16 wherein the body also has an audio selector means, the audio selector means allowing the user to selectively:
   a. deliver the first device's first audio signal to both of the first and second audio output speakers, and exclude the second device's second audio signal from both of the audio output speakers;
   b. deliver the second device's second audio signal to both of the first and second audio output speakers, and exclude the first device's first audio signal from both of the audio output speakers; and
   c. deliver at least a portion of each of the first and second audio signals to a respective one of the first and second audio output speakers.

18. The communications device of claim 13 wherein the audio input microphone and audio input switch are located in planes on opposing sides of the location at which the neck loop extends from the communicator body.

19. The communications device of claim 13 wherein the audio input microphone is rigidly affixed to the communicator body, and protrudes forwardly therefrom at or above the location at which the neck loop extends from the communicator body.

20. The communications device of claim 13 wherein the audio input/output connector is situated at the bottom of the communicator body.

21. A communications device comprising a communicator body which has:
   a. a neck loop extending from the communicator body at or near the top of the communicator body, the neck loop being adapted to fit about a user's neck, b. an audio input microphone at or near the top of the communicator body, into which a user may deliver an audio message;
c. an audio input switch at or near the top of the communicator body, wherein the audio input switch selectively activates the audio input microphone,
d. first and second audio output speakers, each:
   (1) being provided on a respective flexible lead extending from the body, and
   (2) being adapted to fit within or about a user's ear;
e. an audio input/output connector, located at or near the bottom of the communicator body, to which a user may connect a first device which both:
   (1) outputs a first audio signal to one or both of the audio output speakers, and
   (2) receives audio messages delivered by the user into the audio input microphone when the audio input switch is activated;
wherein:
i. the communicator body is elongated, with its length being rounded about its circumference and being sized and configured to be comfortably gripped in a user's hand in the manner of a joystick,
ii. the audio input microphone and audio input switch are located in planes on opposing sides of the location at which the neck loop extends from the communicator body,
iii. the communicator body is structured to accommodate the user's hand wrapped around the circumference of the communicator body without the hand obstructing the input microphone or the audio input switch,
whereby a user may:
   A. wear the neck loop about his/her neck with the communicator body descending toward his/her chest,
   B. grip the communicator body with one hand, with a thumb being situated above the audio input switch, and
   C. lift the communicator body to situate the audio input microphone adjacent his/her mouth, whereupon the user may activate the audio input switch and deliver an audio message to the audio input microphone.

22. The communications device of claim 21 further comprising:
a. an audio input connector to which a user may connect a second device which outputs a second audio signal to one or both of the audio output speakers; and
b. audio selector means, the audio selector means allowing the user to selectively:
   (1) deliver the first audio signal to both audio output speakers and exclude the second audio signal from both audio output speakers;
   (2) deliver the second audio signal to both audio output speakers and exclude the first audio signal from both audio output speakers.

23. The communications device of claim 22 wherein the audio selector means further allow the user to selectively deliver at least a portion of each of the first and second audio signals to one or both of the audio output speakers.

24. The communications device of claim 21 wherein the flexible leads are constrained to extend from the communicator body within or immediately alongside at least a portion of the neck loop.

* * * * *

UNITED STATES PATENT AND TRADEMARK OFFICE
CERTIFICATE OF CORRECTION

PATENT NO. : 7,720,234 B1  Page 1 of 1
APPLICATION NO. : 11/123669
DATED : May 18, 2010
INVENTOR(S) : Jonathan T. Winslow It is certified that error appears in the above-identified patent and that said Letters Patent is hereby corrected as shown below:

The title page, item 75, inventors: Delete "Alex Saban"

Signed and Sealed this

Twenty-ninth Day of June, 2010

David J. Kappos
*Director of the United States Patent and Trademark Office*